(12) United States Patent
Csák et al.

(10) Patent No.: US 7,967,114 B2
(45) Date of Patent: Jun. 28, 2011

(54) CLAMP DEVICE

(75) Inventors: Bence Csák, Budapest (HU); Michael Herges, Korntal-Muenchingen (DE); Dirk Ganzhorn, Munich (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 444 days.

(21) Appl. No.: 11/723,163

(22) Filed: Mar. 16, 2007

(65) Prior Publication Data

US 2007/0251773 A1 Nov. 1, 2007

Related U.S. Application Data

(63) Continuation of application No. PCT/EP2005/009918, filed on Sep. 15, 2005.

(30) Foreign Application Priority Data

Sep. 17, 2004 (DE) .......................... 10 2004 045 165
Feb. 24, 2005 (DE) .......................... 10 2005 008 404

(51) Int. Cl.
  *F16D 55/08* (2006.01)
(52) U.S. Cl. ................. 188/72.7; 188/72.2; 188/265
(58) Field of Classification Search ............. 188/71.1, 188/71.3, 72.7, 72.2, 265
  See application file for complete search history.

(56) References Cited

U.S. PATENT DOCUMENTS

| 2,633,941 | A | * | 4/1953 | Zindler | ............... 188/106 A |
| 3,289,795 | A | * | 12/1966 | Klaue | ............... 188/71.3 |
| 3,439,780 | A | | 4/1969 | Frigger | |
| 4,121,696 | A | | 10/1978 | Margetts | |
| 4,235,312 | A | | 11/1980 | Garrett et al. | |

FOREIGN PATENT DOCUMENTS

| GB | 469841 | 8/1937 |
| JP | 52-134972 A | 11/1977 |

OTHER PUBLICATIONS

International Search Report dated Jan. 2, 2006 with an English translation of the pertinent portion (two (2) pages).
Official Communication Regarding the Examination Report mailed Nov. 25, 2010 and English translation thereof.

* cited by examiner

*Primary Examiner* — Bradley T King
(74) *Attorney, Agent, or Firm* — Crowell & Moring LLP

(57) ABSTRACT

A clamp device inserted between two parts can prevent a relative movement between a brake disc and a brake caliper of a vehicle brake. The device includes two plates, with adjustable separation by way of at least two rollers running against each other and rolling on roller surfaces on facing inner sides of the plates. When the rollers are located in the region of a first section of the roller surfaces, the separation of the plates for bringing about clamping in an extended state is greater than the separation adopted by the plates to generate clamping in a withdrawn state when the rollers are located in the region of a second section of the roller surfaces. The position of the rollers relative to the roller surfaces may be altered by an actuator.

20 Claims, 5 Drawing Sheets

CLAMP DEVICE

This application is a continuation of international PCT application PCT/EP2005/009918, filed Sep. 15, 2005, the entire disclosure of which is incorporated herein by reference and which claims the priority of prior German applications DE 10 2004 045 165.6, filed Sep. 17, 2004, and DE 10 2005 008 404.4, filed Feb. 24, 2005.

BACKGROUND AND SUMMARY OF THE INVENTION

This invention relates to a wedging clamp device for insertion between two parts, capable of performing a relative movement in relation to one another, in order to prevent their relative movement. The device is particularly useful in order to prevent relative movement between a brake disk and a brake caliper of a vehicle brake, comprising two plates, the separation between which is adjustable by means of at least two opposed rollers rolling on rolling surfaces on opposing inner sides of the plates. For bringing about wedging in an extended state, the separation of the plate is greater when the rollers are situated in the area of a first section of the rolling surfaces than the separation, assumed by the plates for release of wedging in a retracted state, when the rollers are situated in the area of a second section of the rolling surfaces. The position of the rollers relative to the rolling surfaces is adjustable by means of an actuating device.

Such a wedging clamp device is disclosed by U.S. Pat. No. 4,121,696. A disadvantage with this wedging clamp device, however, is that the normal force needed to generate wedging friction is produced by a displacement of rollers along the rolling surfaces, so that in order to generate greater holding forces, as are necessary for vehicle parking brakes, for example, the actuating device must exert correspondingly large actuating forces, which makes the device bulky and expensive. A relatively large energy input is then needed for the actuating device. Finally, the rollers have a tendency to wear, owing to the movement occurring under large forces.

One object of the present invention is to create a wedging clamp device which largely eliminates these disadvantages.

According to the invention, this object is achieved by having at least two wedges that can be wedged against one another, with at least one of the wedges being actuatable by a further actuating device in the wedging or release direction. One actuating device first brings the plates from their retracted position into the extended state, and the further actuating device then actuates at least one of the wedges, in a direction preventing a relative movement between the two parts, in order to bring about wedging. The one actuating device brings the plates from their extended position into the retracted position, and the further actuating device actuates at least one of the wedges in a direction allowing a relative movement between the two parts in order to release the wedging.

Compared to known devices, this has the advantage that the normal force required to generate the wedging friction between the two parts moving relative to one another is produced by actuation of at least one of the wedges instead of by actuation of the rollers. Due to friction, this wedge is then carried by the still moving part, or the part still subject to a torque or force, such as a brake disk, and wedges further against the other wedge, resulting in a greater thickness of the wedge assembly, an increase in the normal force, and, ultimately therefore, also an increase in the friction forces, so that the moving part or the part still under torque or force is finally frictionally locked to the other part. The rollers, on the other hand, are not actuated during the wedging process. They are in a position in which the plates are extended.

The plates of the wedging clamp device may separate and come together in a substantially linear and parallel manner due to the movement of the rollers along the rolling surfaces. Alternatively the wedging clamp device may act like a folding wedge, in that the plates fold out and in at an angle to one another.

In one preferred embodiment, the plates can be folded out and in at an angle to one another under a rotational movement about an articulated connection arranged at their ends. The other ends are provided with the rolling surfaces. This gives the wedging clamp device a wedge-shaped cross section in the extended or deployed state so that it will wedge between the parts performing the relative movement in relation to one another, preferably until self-locking occurs.

According to another measure, the actuating device has a spring, which preloads the plates into the extended position. In order to achieve a defined rolling behavior on the rolling surfaces, the rollers, viewed in an axial direction, may each have, at least in sections, a circumferential external toothing, which meshes with toothing systems on the rolling surfaces. An advantageous dual function of the toothing is obtained, namely defined guiding of the rollers against the plates and an actuating drive, if the actuating device comprises a rack arranged between the rollers, which rack has a double toothing on the longitudinal sides remote from one another and which meshes with the external toothing systems of the rollers. The rollers can then be guided along the rolling surface by the linear motion of the rack, for which purpose a simple linear drive, even a manual one, for example, will suffice. The toothing systems give the rollers a defined rolling behavior, thereby also achieving a defined wedging and release behavior.

If the spring serves to preload the rack into a position in which the rollers are situated in the area of the first section of the rolling surfaces, the wedging clamp device will always be automatically preloaded into its deployed position without the need for further measures or manual operations. The wedging action can then easily be released by a linear movement of the rack against the action of the spring, causing the rollers to roll into the area of the second section of the rolling surfaces, whereupon the wedging clamp device shifts into the retracted position. This will allow wedging and release of the wedging clamp device to be repeated any number of times.

According to certain features, multiple rolling surfaces and rollers can also be arranged in series, which allows very large wedging forces to be generated.

One embodiment provides for a parallel connection of the two plates, adjustably separated by the rollers.

The invention further provides for a vehicle brake device, particularly for a commercial vehicle, comprising a disk brake with a brake disk and a brake caliper which is designed for the insertion of a wedging clamp device according to the invention. In this device a wedge face of the brake caliper is most preferably formed with a wedge angle in relation to the plane of the brake disk, in such a way that with the brake disk rotating in relation to the brake caliper, and the wedging clamp device inserted in an extended or deployed state between the wedge face of the brake caliper and the brake disk, the wedging clamp device wedges ever more tightly until self-locking occurs. Consequently the spring mainly serves to preload the wedging clamp device into the deployed position and in an ancillary manner for generating the normal forces from which the friction force of the brake disk ensues. The spring can therefore be designed smaller and lighter, and the actuating forces are low, so that the wedging clamp device is easy to operate manually and a small, lightweight drive is sufficient for the rack.

The outer face of one plate is most preferably intended to bear against the brake disk of the vehicle brake and has a higher coefficient of friction than the outer face of the other plate, which is intended to bear against a wedge face of the brake caliper of the vehicle brake opposite the brake disk and is therefore likewise of wedge-shaped design. The higher coefficient of friction on the one plate can be accomplished, for example, by a separate friction lining, which ensures that static friction between the brake disk and the wedging clamp device is achieved. The outer face of the other plate, on the other hand, need not have a high coefficient of friction, since it is secured to the wedge face of the brake caliper by positive interlock and thereby generates the normal force necessary for the static friction.

The construction of the wedging clamp device according to the invention will be apparent from the following description.

Exemplary embodiments of the invention are represented in the drawings and are explained in more detail in the following description.

DETAILED DESCRIPTION OF THE DRAWINGS

Figure 1:
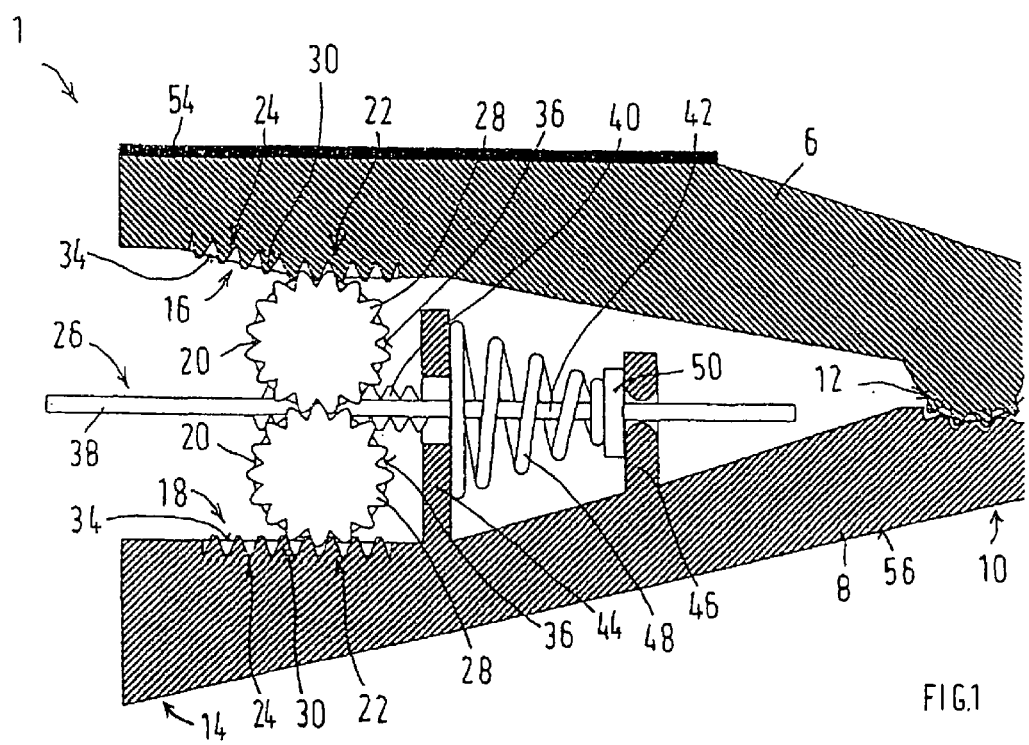
FIG. 1 shows a highly schematic cross-sectional representation of a wedging clamp device according to a preferred embodiment of the invention.

The preferred embodiment of a wedging clamp device denoted by 1 in FIG. 1 serves, for example, to prevent relative movement between a brake disk 2 and a brake caliper 4 (see FIG. 4) of a vehicle brake and in use is intended to act as a handbrake or parking brake.

Figure 3:
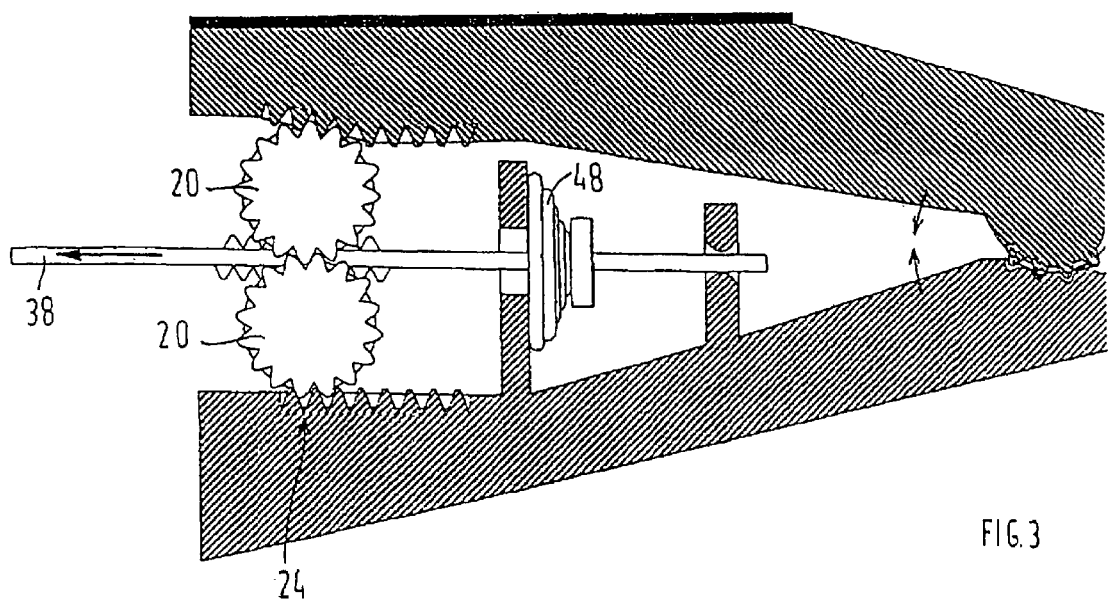
FIG. 3 shows a highly schematic cross-sectional representation of the wedging clamp device in FIG. 1 in a retracted position.

The wedging clamp device 1 comprises two plates 6, 8, which, at one of their ends 10, are articulated on one another. The articulated bearing may be provided, for example, by intermeshing toothing strips 12 in curved form arranged at the edge of the plates 6, 8, as can be seen, in particular, from FIG. 2, Separation of the other ends 14 of the plates is adjustable, preferably by two opposed rollers 20 rolling on rolling surfaces 16, 18 on opposing inner sides of the plates 6, 8. As FIGS. 1 and 3 illustrate, the separation of the other ends 14 of the plates 6, 8, for bringing about wedging in a deployed state, is greater when the rollers 20 are situated in the area of a first section 22 of the rolling surfaces 16, 18 (FIG. 1) than the separation, assumed by the other ends 14 of the plates 6, 8 for releasing the wedging in a retracted state, when the rollers 20 are situated in the area of a second section 24 of the rolling surfaces 16, 18 (FIG. 3).

Viewed in cross section, the second section 24 of the rolling surface 16 of the one plate 6 preferably widens relative to the first section 22. In the other plate 8, on the other hand, the first section 22 and the second section 24 of the rolling surface 18 are in a plane. The position of the rollers 22 relative to the rolling surfaces 16, 18 is adjusted by an actuating device 26.

Viewed in an axial direction, each of the rollers 20, at least in sections, has a circumferential external toothing 28, which meshes with toothing systems 30 on the rolling surfaces 16, 18. As can be seen from FIG. 2, these kinematics can be achieved, for example, in that, viewed in an axial direction, rings with circumferential external toothing 28 are in each case arranged only at the ends of the cylindrical rollers 20 and mesh with toothing strips 30 at the edge of the plates 6, 8. In their middle sections, the rollers 20 each have a circumferential external toothing 32 of limited axial extent. The toothing systems 28, 32 are only intended to ensure a defined guiding of the rollers 20 relative to the rolling surfaces 16, 18, and do not transmit any wedging forces. On the other hand, smooth, plain sections 34, 36 of the rolling surfaces 16, 18 and the rollers 20 axially interposed between the toothing systems 28, 32 are load-transmitting and come into contact with one another under surface pressure when wedging forces take effect.

According to the preferred embodiment, the actuating device 26 comprises a rack 38, which is radially interposed between the rollers 20 and which viewed in a longitudinal direction has a double toothing 40 formed approximately in the middle area on the longitudinal sides remote from one another. This double toothing meshes with the rotating, central external toothing systems 32 of the rollers 20. By means of one of its plain end sections 42, the rack 38 is guided tangentially in relation to the rollers 20, for example on two bearing brackets 44, 46 carried by a plate 8. The rollers 20 are thereby guided not only in relation to the rolling surfaces 16, 18 of the plates 6, 8, but also in relation to one another and relative to the rack 38.

In addition, the actuating device 26 has a spring 48, which preloads the wedging clamp device 1 and the plates 6, 8 into the deployed position, as is shown in FIG. 1. As shown, the spring is a compression spring 48, which is braced on one side against the bearing bracket 44 facing the other end 14 of the plates 6, 8 and on the other against a ring 50 axially fixed to the plain end section 42 of the rack 38, and specifically serves to preload the rack 38 into a position in which it carries the rollers 20 into the area of the first section 22 of the rolling surfaces 16, 18. In this position the wedging clamp device 1 is in a deployed state. In order that coils of the compression spring 48 can sink into one another when compressed, the spring is of tapered design shape. The rack 38 may be made to engage and disengage either manually or also by any form of drive.

Figure 4:
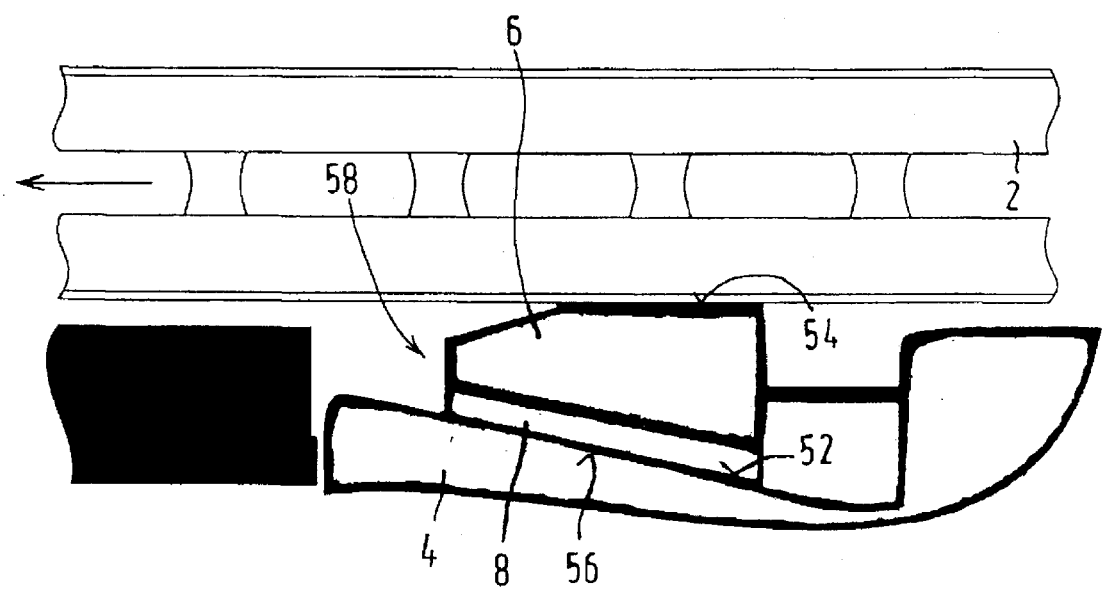
FIG. 4 is a top view of the wedging clamp device in FIG. 1 wedged between a brake disk and a brake caliper of a vehicle.

The plane outer face of the one plate 6 is most preferably intended to bear against the brake disk 2 of the vehicle brake, and has a higher coefficient of friction than the outer face 56 of the other plate 8, which is intended to bear against a wedge face 52 of the brake caliper 4 situated opposite the brake disk 2 and is therefore likewise of wedge-shaped design, as is particularly apparent from FIG. 4. The higher coefficient of friction on the one plate 6 can be achieved, for example, by a separate friction lining 54 which is applied to the outer face and which ensures that static friction is generated between the brake disk 2 and the wedging clamp device 1 (FIGS. 1 and 3.) The outer face 56 of the other plate 8, on the other hand, need not have a high coefficient of friction, since it is secured by positive interlock against the wedge face 52 of the brake caliper 4 and thereby generates the normal force necessary for static friction.

Figure 2:
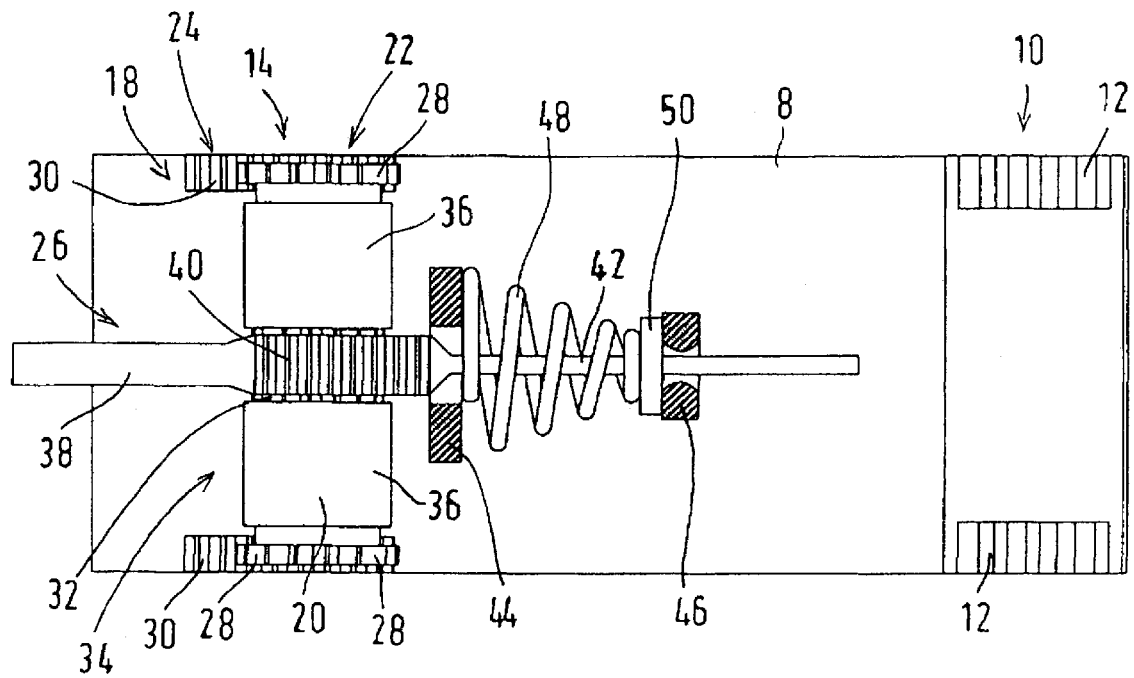
FIG. 2 is a cut-away top view of the wedging clamp device in FIG. 1.

If the rack 38, starting from its position shown in FIG. 1 in which the rollers 20 are situated in the area of the first section 22 of the rolling surfaces 16, 18, is drawn, for example manually, away from one of the ends 10 of the plates 6, 8, in the direction of the arrow in FIG. 2, that is to the left, the rollers 20 will likewise roll along the rolling surfaces 16, 18 to the left and will move into the area of the second section 24. Consequently, on the one hand, the two plates 6, 8 are pivoted towards one another about the articulated connection 12, and on the other, the separation between the other, opposing ends 14 of the plates 6, 8 is reduced. In this retracted state, the wedging clamp device 1 according to the invention can be inserted, for example, into a gap 58 between the brake disk 2 and the brake caliper 4, by first aligning the other plate 8 against the associated wedge face 52 of the brake caliper 4. The force on the rack 38 is then relieved, for example by releasing it, so that the rollers 20, due to the relaxation of the compression spring 48, return to their starting position shown in FIG. 1, in which the plates 6, 8 are deployed and the friction lining 54 of the one plate 6 consequently comes to bear against the brake disk 2.

The wedge face 52 of the brake caliper 4 is preferably designed to form a wedge angle with the plane of the brake disk 2, in such a way that, under the relative movement between the brake disk 2 and the brake caliper 4, the deployed wedging clamp device 1 wedges ever more tightly, until self-locking ultimately occurs. The compression spring 48 is therefore intended more to ensure return of the rollers than to generate the normal forces resulting in the friction force on the brake disk 2.

To release the wedging clamp device 1, the rack 38 is again moved manually, for example, to the left against the action of the compression spring 48, as shown in FIG. 3, the rollers 20 moving into the area of the second section 24 of the rolling surfaces 16, 18 and the separation between the other ends 14 of the plates 6, 8 diminishing, so that the wedging clamp device 1 can be easily withdrawn from the gap 58 between the brake disk 2 and the brake caliper 4.

The invention is not limited to the exemplary embodiment described, in which the two plates 6, 8 can be folded in and out in relation to one another.

Figure 5:
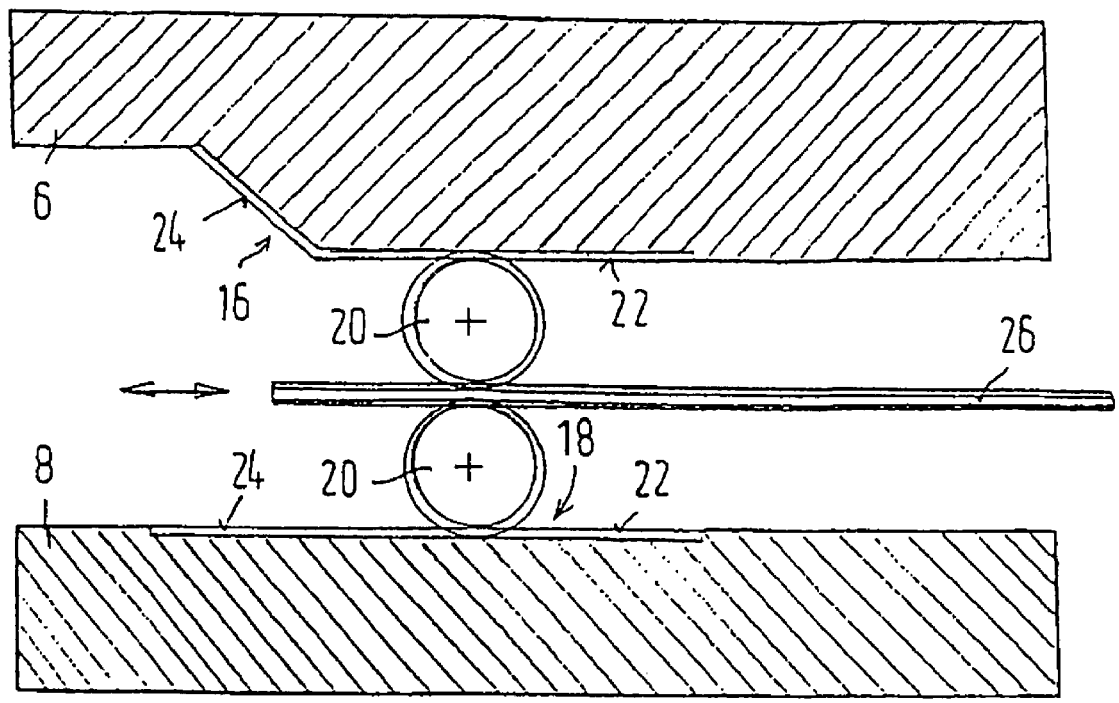
FIG. 5 shows a highly schematic cross-sectional representation of a wedging clamp device according to a further embodiment of the invention.

Alternatively, the plates of the wedging clamp device may separate and come together in a substantially linear and parallel manner due to the movement of the rollers 20 along the rolling surfaces 16, 18, as embodied in the exemplary embodiment according to FIG. 5.

Viewed in cross section, the second section 24 of the rolling surface 16 of the one plate 6 preferably widens relative to the first section 22. In the other plate 8, on the other hand, the first section 22 and the second section 24 of the rolling surface 18 are even and coplanar with one another. The position of the rollers 22 relative to the rolling surfaces 16, 18 is again adjusted by an actuating device 26, which again takes the form of a rack, for example. A linear actuation of the rack 26 towards the second sections 24 causes the two rollers 20 to move from a position in the area of the first sections 22 running parallel to one another, in which the two plates 6, 8 are at the maximum distance from one another and the wedging clamp device 1 is therefore in an extended state (wedging position), into a position in the area of the second sections 24, in which one of the rollers 20 rolls on the second section 24 of the plate 6 widening in a wedge shape and the plates 6, 8 are therefore situated in a retracted state with a smaller separation (release of the wedging). Actuation of the rack 26 in the opposite direction, that is to say towards the first sections 22, brings about wedging again.

Figure 6:
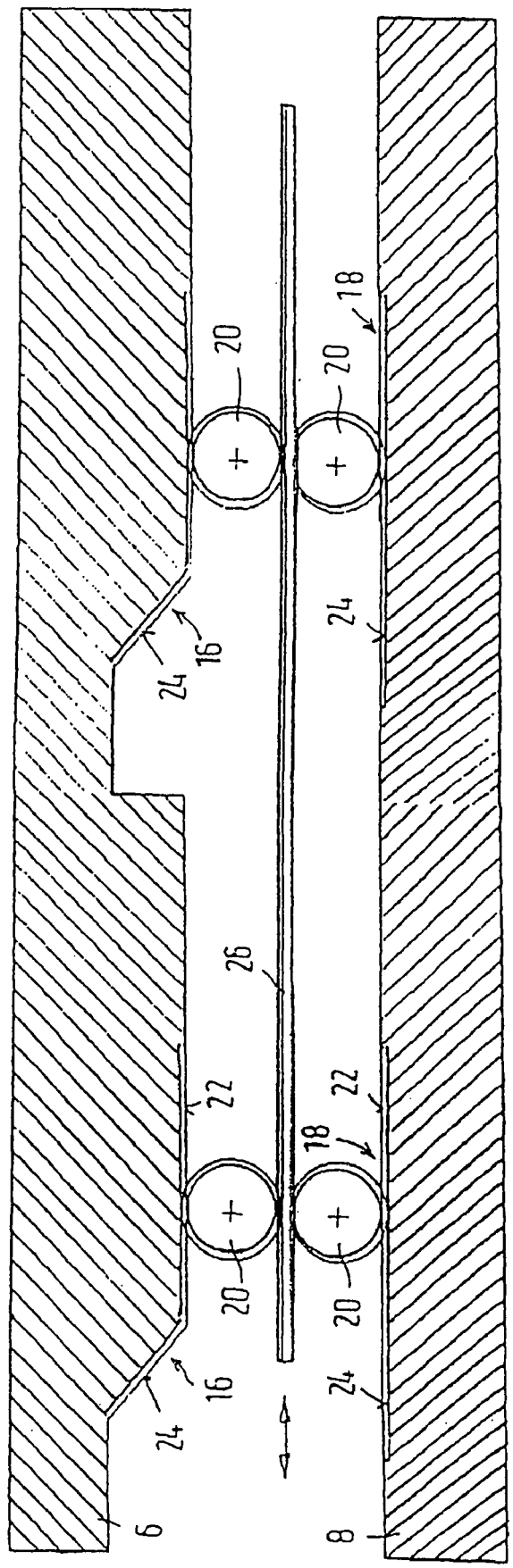
FIG. 6 shows a highly schematic cross-sectional representation of a wedging clamp device according to a further embodiment of the invention.

Instead of providing a wedge-shaped section 24 of the rolling surface 16 on just one of the plates 6, such a surface can also be provided on the other plate 8. Multiple rolling surfaces 16, 18 with associated rollers 20 can also be arranged in series, as the embodiment in FIG. 6 shows. In each case, rolling surfaces 16, 18 of the same type, that is to say ones which are flat like the surfaces 18 and ones which are wedge-shaped, like the rolling surfaces 16, are formed on one of the plates 6, 8.

Figure 7:
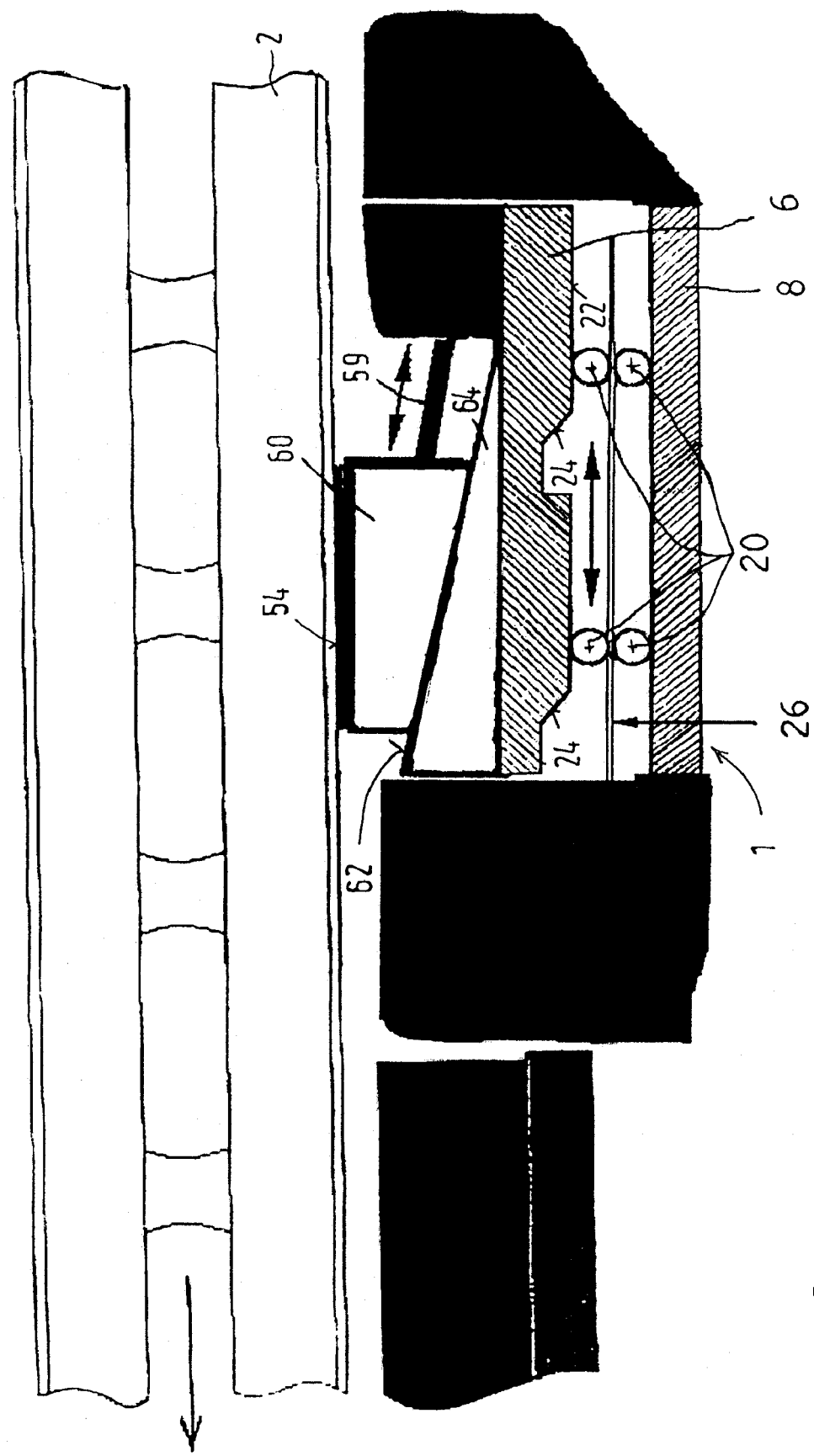
FIG. 7 is a top view of the wedging clamp device in FIG. 6 wedged between a brake disk and a brake caliper of a vehicle.

FIG. 7 shows a preferred applied example of the embodiment in FIG. 6. A wedge 60, which tapers in the direction of rotation of the brake disk 2 and interacts with a complementary wedge face 62 of a further wedge 64 tapering counter to the direction of rotation of the brake disk 2, is provided between the plate 6 and the brake disk 2. The wedging clamp device 1 can thereby form a service and/or parking brake. As indicated by the arrow, the wedge 60 can be linearly actuated by a further actuating device 59 in such a way that it can slide along the wedge face 62 and can therefore vary both the distance of the friction lining 54 from the brake disk 2 and the contact pressure against the brake disk 2. A flat side of the other wedge 64 is also in contact with the outer face of the plate 6, which together with the plate 8 and the rollers 20 corresponds to the exemplary embodiment of a wedge brake 1 in FIG. 6 and is actuated by a linear movement of the actuating device 26.

Wedging is achieved in that the wedge 60 on the wedge face 62 is displaced to the left in FIGS. 4 and 7, comes into contact with the brake disk 2 and is carried onward by the latter up to the point of full locking. During this process the plates 6, 8 must already be in the deployed or extended state. In this case the plates 6, 8 together with the rollers 20 serve to allow the wedging clamp device 1 to be released again with little force. If the plates 6, 8 are in the stowed or retracted position owing to an actuation of the actuating device 26, the wedge 60 must first be drawn back fully to the right again before the plates 6, 8 can be deployed or extended again. The normal force required in order to generate the wedging friction is therefore not generated by an actuation of the rollers 20, but is braced against the brake caliper 4 solely via the plates 6, 8 situated in the deployed state. Because the normal force in the deployed state of the plates 6, 8 must have no influence on the movement of the rollers 20, the rolling surfaces 16 and 18 in the first section 22 are parallel with one another. The section 24 here does not contribute to the wedging action, but serves merely to reduce the separation of the plates 6 and 8, which leads to a reduction of the normal force and results in a release of the wedge 60, which can then be retracted with virtually no force. Since the rollers 20 roll on the first section 22 at an angle of 90° to the normal force, and the normal force therefore has no component in one of the moving directions of the rollers 20, this motion also occurs without any force except for a slight rolling friction. Once the rollers 20 reach the second section 24, the direction of movement is no longer at 90° to the normal force and the component of the normal force in the moving direction of the rollers 20 assists in further opening. The rollers 20 slide into the stowed position, so to speak. They can only be moved back, however, if the wedge 60 has first been run into the right-hand position, so that even in the deployed or extended state of the plates 6, 8 it does not bear against the brake disk 2 and therefore does not generate any normal force. In this position of the wedge 60 the rollers 20 can run virtually without any force even in the deployed or extended state.

In detail, therefore, the wedging clamp device 1 according to FIG. 7 functions as follows. With the vehicle in motion, the plates 6, 8, due to traversing of the rollers 20 into the first section 22 by the actuating device 26, will be situated in the deployed or extended basic position. The wedge 60 is here situated in the right-hand position, that is to say it is not bearing on the brake disk 2. If, after halting the vehicle, the parking brake is now to be engaged, the plates 6, 8 will still be in the deployed or extended position. The actuating means 59 will, however, cause the wedge 60 in FIG. 7 to move along the wedge face 62 to the left, until it bears on the brake disk 2 and is pressed against the latter with a slight pressure by the actuating means 59. If the vehicle is parked on a sloping surface, the wedge 60 is carried further to the left in FIG. 7 by the brake disk 2 and firmly wedged.

To release the parking brake, with the vehicle stationary a slight tensile force is exerted on the wedge 60 in the release direction, that is to say to the right in FIG. 7, by the actuating means 59, but the wedge 60, initially at any rate, remains firmly wedged. The rollers 20 situated in the first section 22 are thereupon traversed by the actuating device 26, so that the rollers 20 reach the second section 24 and the plates 6, 8 as a result move into the stowed or retracted position. The wedge 60 is now free and is run by the actuating means 59 into the right-hand position, in which it is no longer in contact with the brake disk 2. In order to return to the basic position when in motion, the plates 6, 8 are brought into the extended or deployed position again.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A wedging clamp device for insertion between two parts, capable of performing a relative movement in relation to one another, in order to prevent relative movement between a brake disk and a brake caliper of a vehicle brake, comprising:
    two plates,
    at least two opposed rollers, rolling on rolling surfaces on opposing inner sides of the plates, by which a separation between the plates is adjustable,
    a first actuating device by which a position of the rollers relative to the rolling surfaces is adjustable, and
    at least two wedges that can be wedged against one another, at least one of the wedges being actuatable by a second actuating device in the wedging or release direction,
    wherein the first actuating device has a spring, which preloads the plates into the deployed position,
    wherein each of the rollers, viewed in an axial direction, has, at least in sections, a circumferential external toothing, which meshes with toothing systems on the rolling surfaces,
    wherein separation of the plates, for bringing about a wedging in an extended state, is greater when the rollers are situated in the area of a first section of the rolling surfaces than the separation, assumed by the plates for release of wedging in a retracted state, when the rollers are situated in the area of a second section of the rolling surfaces,
    wherein the first actuating device first brings the plates from their retracted position into their extended position and the second actuating device then actuates said at least one of the wedges in a direction preventing relative movement between the brake disk and the brake caliper in order to bring about wedging, and
    wherein the first actuating device brings the plates from their extended position into the retracted position and the second actuating device actuates said at least one of the wedges in a direction allowing a relative movement between the two parts in order to release the wedging.

2. The wedging clamp device as claimed in claim 1, wherein the plates can be folded out and in at an angle to one another under a rotational movement about an articulated connection arranged at their ends, and wherein the other ends are provided with the rolling surfaces.

3. The wedging clamp device as claimed in claim 1, wherein the first actuating device comprises a rack arranged between the rollers, and wherein the rack has a double toothing on the longitudinal sides remote from one another and which meshes with the associated external toothing systems of the rollers.

4. The wedging clamp device as claimed in claim 3, wherein the spring preloads the rack into a position in which the rollers are situated in the area of the first section of the rolling surfaces.

5. The wedging clamp device as claimed in claim 4, wherein a linear movement of the rack against the action of the spring causes the rollers to roll into the area of the second section of the rolling surfaces.

6. The wedging clamp device as claimed in claim 1, wherein a first section and a second section of a rolling surface of one of the plates are even and coplanar and wherein, viewed in cross section, a second section of a rolling surface of the other of the plates widens or narrows in a wedge shape relative to the first section.

7. The wedging clamp device as claimed in claim 6, wherein an outer face of the one of the plates is intended to bear against a brake disk and has a higher coefficient of friction than the outer face of the other plate, which is intended to bear against a wedge face of the brake caliper opposite the brake disk.

8. The wedging clamp device as claimed in claim 1, wherein multiple rolling surfaces and rollers arranged in series are provided.

9. The wedging clamp device as claimed in claim 1, wherein a parallel connection of the two plates is provided, and wherein the plates are adjustably separated by the rollers.

10. The wedging clamp device as claimed in claim 9, wherein the actuating devices act together to prevent said relative movement.

11. The wedging clamp device as claimed in claim 2, wherein the first actuating device has a spring, which preloads the plates into the deployed position.

12. The wedging clamp device as claimed in claim 11, wherein each of the rollers, viewed in an axial direction, has, at least in sections, a circumferential external toothing, which meshes with toothing systems on the rolling surfaces.

13. The wedging clamp device as claimed in claim 12, wherein the first actuating device comprises a rack arranged between the rollers, and wherein the rack has a double toothing on the longitudinal sides remote from one another and which meshes with the associated external toothing systems of the rollers.

14. The wedging clamp device as claimed in claim 13, wherein the spring preloads the rack into a position in which the rollers are situated in the area of the first section of the rolling surfaces.

15. The wedging clamp device as claimed in claim 14, wherein a linear movement of the rack against the action of the spring causes the rollers to roll into the area of the second section of the rolling surfaces.

16. A vehicle brake device for a commercial vehicle, comprising a disk brake with a brake disk, a brake caliper, and a wedging clamp device as claimed in claim 1 inserted between the brake disk and the brake caliper.

17. The vehicle brake device as claimed in claim 16, wherein the wedging clamp device is inserted into a gap between the brake disk and the brake caliper.

18. The vehicle brake device as claimed in claim 16, wherein a wedge face of the brake caliper is formed with a wedge angle, in relation to the plane of the brake disk, in such a way that, with the brake disk rotating in relation to the brake caliper and the wedging clamp device inserted in an extended state into the gap, the wedging clamp device wedges ever more tightly until self-locking occurs.

19. A wedging clamp device for insertion between two parts, capable of performing a relative movement in relation to one another, in order to prevent relative movement between a brake disk and a brake caliper of a vehicle brake, comprising:

two plates,
  at least two opposed rollers, rolling on rolling surfaces on opposing inner sides of the plates, by which a separation between the plates is adjustable,
  a first actuating device by which a position of the rollers relative to the rolling surfaces is adjustable, and
  at least two wedges that can be wedged against one another, at least one of the wedges being actuatable by a second actuating device in the wedging or release direction,
  wherein each of the rollers, viewed in an axial direction, has, at least in sections, a circumferential external toothing, which meshes with toothing systems on the rolling surfaces,
  wherein separation of the plates, for bringing about a wedging in an extended state, is greater when the rollers are situated in the area of a first section of the rolling surfaces than the separation, assumed by the plates for release of wedging in a retracted state, when the rollers are situated in the area of a second section of the rolling surfaces,
  wherein the first actuating device first brings the plates from their retracted position into their extended position and the second actuating device then actuates said at least one of the wedges in a direction preventing relative movement between the brake disk and the brake caliper in order to bring about wedging, and
  wherein the first actuating device brings the plates from their extended position into the retracted position and the second actuating device actuates said at least one of the wedges in a direction allowing a relative movement between the two parts in order to release the wedging.

20. A vehicle brake device for a commercial vehicle, comprising a disk brake with a brake disk, a brake caliper, and a wedging clamp device as claimed in claim 19 inserted between the brake disk and the brake caliper.

* * * * *